(12) United States Patent
Hawkins et al.

(10) Patent No.: US 12,546,292 B2
(45) Date of Patent: Feb. 10, 2026

(54) METHOD OF CONTROLLING A WIND TURBINE

(71) Applicant: Siemens Gamesa Renewable Energy A/S, Brande (DK)

(72) Inventors: Samuel Hawkins, Vejle (DK); Christian Joachim Krogh, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/840,336

(22) PCT Filed: Jan. 20, 2023

(86) PCT No.: PCT/EP2023/051363
§ 371 (c)(1),
(2) Date: Aug. 21, 2024

(87) PCT Pub. No.: WO2023/160914
PCT Pub. Date: Aug. 31, 2023

(65) Prior Publication Data
US 2025/0163894 A1    May 22, 2025

(30) Foreign Application Priority Data

Feb. 25, 2022   (EP) ..................... 22158716

(51) Int. Cl.
*F03D 80/60* (2016.01)
(52) U.S. Cl.
CPC ...... *F03D 80/602* (2023.08); *F05B 2260/232* (2013.01)
(58) Field of Classification Search
CPC .................................. F03D 80/602
See application file for complete search history.

(56) References Cited

U.S. PATENT DOCUMENTS 7,837,126 B2 * 11/2010 Gao ................. F03D 80/60
236/44 C
8,047,774 B2 11/2011 Bagepalli
(Continued)

FOREIGN PATENT DOCUMENTS

DE   102014208791 A1   11/2014
EP       3236064 B1    8/2018
WO     2021180525 A1    9/2021

OTHER PUBLICATIONS

PCT International Search Report and Written Opinion of International Searching Authority mailed Apr. 12, 2023 corresponding to PCT International Application No. PCT/EP2023/051363 filed Jan. 20, 2023.

*Primary Examiner* — Brian O Peters
(74) *Attorney, Agent, or Firm* — Schmeiser, Olsen & Watts LLP

(57) ABSTRACT

A method of controlling a wind turbine is provided including at least one fan-cooled unit with a fan adapted to circulate air inside a housing of the fan-cooled unit, which method includes operating the fan-cooled unit in a dryout mode by: disabling a thermal energy reduction the fan-cooled unit, which thermal energy reduction means is adapted to reduce thermal energy of air inside the housing during a normal operation mode of the fan-cooled unit; actuating a fan of the fan-cooled unit to circulate the quantity of air contained in the housing; and monitoring a climate parameter until a target climate condition has been reached. A wind turbine configured to execute the steps of the inventive method is also provided.

17 Claims, 4 Drawing Sheets

(56) References Cited

U.S. PATENT DOCUMENTS

| | | |
|---|---|---|
| 9,624,908 B2 | 4/2017 | Airoldi et al. |
| 10,428,803 B2 | 10/2019 | Lund |
| 2010/0061853 A1* | 3/2010 | Bagepalli ................ F03D 80/40 165/104.34 |
| 2010/0253079 A1 | 10/2010 | Bolln et al. |
| 2017/0370349 A1 | 12/2017 | Ritter et al. |
| 2020/0064016 A1* | 2/2020 | Suriya Prakash ... F24F 13/1426 |
| 2023/0160371 A1 | 5/2023 | Moeller |

* cited by examiner

METHOD OF CONTROLLING A WIND TURBINE

CROSS-REFERENCE TO RELATED APPLICATIONS

This application is a national stage of PCT Application No. PCT/EP2023/051363, having a filing date of Jan. 20, 2023, which claims priority to EP Application Serial No. 22158716.5, having a filing date of Feb. 25, 2022, the entire contents both of which are hereby incorporated by reference.

FIELD OF TECHNOLOGY

The following relates to a method of controlling a wind turbine.

BACKGROUND

Moisture and condensation can pose a risk for the electrical components of a wind turbine. Particularly after an extended duration without power, the climate in an interior of the wind turbine—for example inside the nacelle or inside the tower—can be cold and damp, i.e., the relative humidity is high. It is generally unsafe to restart an electrical machine or electrical device under such conditions, since condensation droplets on circuit boards, switches or electrical wires can increase the likelihood of short circuit between parts that are otherwise separated by air. Such "standing water" also encourages corrosion. Furthermore, moisture absorbed by hygroscopic material, as used for example in armature winding insulation, can increase the likelihood of short circuit between windings of the generator, leading to serious damage. Other critical (i.e., temperature-sensitive and/or moisture-sensitive) components that require dry starting conditions may include a field winding insulation system, a frequency converter, an inductive filter, a printed circuit board, etc.

In a known approach, a wind turbine connected to grid power after an extended down-time is first operated in a "dry-out mode" during which the temperature in the interior is increased and the relative humidity is lowered. The duration of the dry-out mode is generally a conservatively chosen length of time, for example 72 hours. During this time, the wind turbine is not exporting power and significant revenue is sacrificed. The dry-out duration can be decreased by deploying one or more heaters to heat the cold air and to lower the relative humidity. However, such heaters have no other purpose, and a disadvantage of this approach is the added expense of having to install and maintain a device that is only occasionally required.

SUMMARY

An aspect relates to an improved way of controlling a wind turbine after an off-grid state.

In the context of embodiments of the invention, any component contained in a housing along with a fan for cooling purposes shall be understood as a "fan-cooled unit". For example, any unit such as a field winding insulation system, a frequency converter, an inductive filter, a printed circuit board etc., can be enclosed in a housing, and one or more fans may be installed in the unit housing for cooling purposes.

A wind turbine can comprise a climate control arrangement with at least one cooling unit which-during normal operation of the wind turbine-serves to remove heat from other components of the wind turbine. Such a cooling unit can comprise a housing enclosing a wind turbine component (e.g., the armature and/or field windings), and one or more fans disposed inside the housing. During normal operation of the wind turbine, any fan of such a cooling unit is controlled to move air about inside the cooling unit, as part of a cooling operation. Such a cooling unit may also be referred to as a "fan-cooled unit" in the context of embodiments of the invention. Warmed air can be allowed to escape or exit the housing of such a fan-cooled unit through an exit opening: equally, the warmed air can be cooled by a heat exchanger arranged in the unit housing. Therefore, any such means can be regarded as a "thermal energy extraction means" or "thermal energy reduction means", because it serves to extract heat from the air (i.e., to reduce the thermal energy of the air) inside the housing of the fan-cooled unit.

According to embodiments of the invention, the method of controlling a wind turbine comprises the steps of: disabling a thermal energy extraction a fan-cooled unit: actuating a fan of the fan-cooled unit to circulate the contained quantity of air contained in the housing; and monitoring a temperature until a target temperature has been reached. Until such time, any temperature-sensitive equipment disposed within the housing can remain switched off. The actuated fan heats the enclosed quantity of air in a two-fold manner: from electrical losses of the fan or blower, and from kinetic energy released from the agitated air. These method steps are carried out to perform a dry-out procedure, for example in response to a dry-out command issued by a local or remote wind turbine controller of that wind turbine prior to starting the wind turbine.

In the case of a fan-cooled unit that is used as a cooling unit during normal operation of the wind turbine, the inventive method effectively operates the cooling unit in a mode of operation that is not its "normal" mode of operation, i.e., the cooling unit is operated in a mode that would otherwise be avoided. In the context of embodiments of the invention, this "non-normal" mode of operation of a fan-cooled unit is referred to as its "dry-out mode of operation".

The inventive method utilizes equipment typically already deployed in a wind turbine for cooling purposes and, instead of using this equipment to remove heat from the wind turbine interior, in embodiments, the method uses this equipment to generate heat during a dry-out procedure. Embodiments of the invention are based on the insight that operating any electric device inside an enclosed unit will raise the temperature of the air inside that unit because of unavoidable losses of the device itself, and from the conversion of kinetic energy through collisions of the agitated air molecules. During the dry-out procedure, the electrical equipment housed inside a fan-cooled unit can remain switched off, and all heat is generated by the fan.

An advantage of the inventive method is that an acceptable level of relative humidity and/or an acceptable temperature can be reached in the interior of a unit housing following an off-grid state, without the need for any additional heaters. This can favorably reduce the manufacturing and maintenance costs of the wind turbine. During the dry-out procedure, the dry-out management module causes the fans of any fan-cooled unit to turn. The air inside the housing is heated by waste heat generated by the fan, and also by the kinetic energy of the agitated air. As time passes, the relative humidity of the heated air decreases towards an acceptable level at which any temperature-sensitive equipment disposed within the housing can be safely switched on. With the inventive method, the climate in the interior of a fan-cooled unit can be regulated after an extended off-grid state without the additional cost of having to install heaters that require maintenance, but which are seldom needed.

A wind turbine cannot restart after a prolonged off-state if even only one critical component cannot be switched on. Embodiments of the invention are based on the insight that not all wind turbine components need to be dry before re-starting, and by targeted drying of the critical components, the wind turbine is able to resume operation within a favorably short length of time.

According to embodiments of the invention, the wind turbine comprises at least one fan-cooled unit that is equipped with a fan arranged in the interior of a unit housing, and a thermal energy extraction means adapted to extract thermal energy from the air in the housing interior. The purpose of the thermal energy extraction means is to remove thermal energy from within the unit housing during normal operation of that unit. The wind turbine further comprises a sensor arrangement configured to monitor a temperature; and a dry-out management module configured to receive a dry-out command, and to execute the steps of the inventive method to perform a dry-out procedure. The dry-out management module is configured to disable a thermal energy extraction any fan-cooled unit, and to actuate a fan of such a fan-cooled unit to circulate the contained quantity of air contained in its housing.

An advantage of the inventive wind turbine is that it can be restarted after a favorably brief duration, since the conditions in the vicinity of moisture- and temperature-sensitive components inside a fan-cooled unit can be improved relatively quickly to a level that allows the wind turbine to start. The inventive wind turbine does not require dedicated units such as heaters in order to perform the dry-out procedure, favorably avoiding additional expense for manufacturing and maintenance. Instead, only "waste heat", generated by electrical losses of the fan(s) and by collisions of the moving air molecules inside the housing interiors of any fan-cooled units, is used to raise the temperature around such components and to remove any standing water from their surfaces.

An aspect also relates to a computer program product (non-transitory computer readable storage medium having instructions, which when executed by a processor, perform actions) for carrying out the steps of the inventive method when the computer program product is loaded into a memory of a controller of the wind turbine.

In the following, it may be assumed that the wind turbine comprises a nacelle supported by a tower, and that the purpose of the wind turbine is to generate electricity for export and/or for local use, for example to power an electrolyzer. Moisture- and temperature-sensitive components such as those described in the introduction can be installed at various locations, for example in the nacelle, in the hub, inside the tower, etc. One or more such components enclosed in a housing with a fan and thermal extraction means that can be actuated by the dry-out management module may be referred to as a fan-cooled unit in the following. The nacelle itself may also be regarded as a fan-cooled unit, if it has a number of fans and a mechanism for extracting heat during normal operation of the wind turbine, and wherein the fan(s) and the thermal energy extraction means can be operated by the dry-out management module.

The thermal energy extraction a fan-cooled unit can be an air exit opening or aperture in one side of the housing, through which warm air can escape to the exterior during a normal mode of operation of the wind turbine. In an embodiment of the invention, the dry-out management module is configured to actuate a moveable cover arranged over such an air exit opening, in order to close the air exit opening in preparation for a dry-out procedure, while any fans inside the unit are controlled to circulate the enclosed air, causing its temperature to rise.

The dry-out management module can also re-open the moveable cover as appropriate after completion of the dry-out procedure. For example, a fan-cooled unit can comprise a hinged air exit opening. In this case, the dry-out management module is for example configured to actuate the hinge mechanism of the air exit opening. The cover of an aperture in a fan-cooled unit housing can be spring-loaded, for example. Equally, a cover can engage with the housing by an electromagnetic lock, and the cover can be held open or shut by actuating the electromagnetic lock in the appropriate manner.

In an embodiment of the invention, a cooling unit may be a liquid-to-air heat-exchange unit. In this case, the thermal energy extraction the cooling unit can be a fluid cooling circuit with hoses or pipes that convey a cooling fluid, and a motor-driven pump arranged to transport the fluid through the fluid cooling circuit. During a normal mode of operation of the wind turbine, a fan of that cooling unit would direct a cooling airflow over conduits of the fluid cooling circuit. In such an embodiment, the dry-out management module is configured to deactivate the fluid cooling circuit during the dry-out procedure, for example by keeping a motor-driven pump in its off-state during the dry-out procedure, while any fans inside the cooling unit are controlled to circulate the enclosed air, causing its temperature to rise. Ultimately, the climate inside the unit is improved to the extent that any electrical components installed within the unit can be safely started. The dry-out management module can also switch on the motor-driven pump as appropriate after completion of the dry-out procedure.

In another possible embodiment, a cooling unit is a ventilation unit. Such a ventilation unit can comprise a number of louvers which may be regarded as a thermal energy extraction means in the context of embodiments of the invention, since warmed air from the nacelle interior can pass through the louvers to the exterior. In an embodiment of the invention, the dry-out management module is configured to close the louvers of such a ventilation unit while any fans inside the ventilation unit are controlled to circulate the enclosed air, causing its temperature to rise. Ultimately, the climate inside the unit is improved to the extent that any electrical components installed within the unit can be safely started. The dry-out management module can also re-open the louvers as appropriate after completion of the dry-out procedure.

In an embodiment of the invention, the dry-out management module is configured to operate a fan of a fan-cooled unit at its maximum rotational speed during the dry-out procedure in order to heat up the enclosed air as quickly as possible.

The dry-out management module operates a fan of such a unit until a target temperature and/or target relative humidity is reached in the unit interior. In an embodiment of the invention, the control of a fan in a housing unit may then be regulated to maintain the target temperature and/or target relative humidity. For example, the dry-out management module may regulate the speed of the fan in the case of a unit with a single fan. Equally, the dry-out management module may switch on or off one or more fans in the case of a unit with several fans. This mode of regulation can be performed to maintain the temperature (inside the housing) within a desired range. For example, the fan inside a closed singlefan unit may be operated at full speed until the temperature of the enclosed air in the housing reaches 50° C.: the fan is then operated at a reduced speed as the temperature approaches 60° C. The fan can be switched off if the temperature reaches or exceeds 60° C. If the temperature of the enclosed air reduces again to an unacceptable level, the dry-out management module responds by initiating the heating procedure again. In the case of a multiple-fan unit, temperature regulation can be done by switching on/off individual fans as appropriate in order to quickly reach the desired temperature and to maintain the desired temperature.

As indicated above, after grid power is restored following an extended off-grid state, the climate in the nacelle interior may be cold and damp, i.e., with a high relative humidity. Such unfavorable conditions may be assumed to prevail following the off-grid state, and a wind turbine may be required to first complete a dry-out procedure before re-starting the wind turbine. The dry-out procedure may persist for a predetermined duration, or may be terminated once the climate in the nacelle interior is once again satisfactory.

In embodiments, the method comprises a subsequent step of operating a cooling unit in a normal mode when the target climate parameter has been reached, i.e., upon completion of the dry-out procedure, since the wind turbine will generally be restarted as soon as the dry-out procedure is complete, and components of the wind turbine will start to generate waste heat that should be removed from the nacelle interior. For example, the dry-out management module can be configured to re-open the exit openings that it had previously closed in preparation for the dry-out procedure. Similarly, the dry-out management module can be configured to reduce the rotational speed of the fan that it had previously controlled to rotate at a high speed.

The step of monitoring a climate parameter comprises obtaining measurements of temperature and/or humidity, for example from sensors deployed in various positions in the nacelle interior. In an embodiment of the invention, the wind turbine deploys at least one temperature sensor and/or at least one humidity sensor in the nacelle interior. In an embodiment of the invention, the wind turbine deploys a resistive hygrometer which provides measurements of relative humidity in the nacelle interior.

A target climate parameter value can be a minimum temperature, for example, and the dry-out procedure is complete when the temperature in the nacelle has been raised from its initial low level to this target minimum level.

Alternatively or in addition, a target climate parameter value can be a maximum humidity (relative or absolute), and the dry-out procedure is complete when the humidity in the nacelle has been decreased from its initial high level to this target maximum level.

BRIEF DESCRIPTION

Some of the embodiments will be described in detail, with reference to the following figures, wherein like designations denote like members, wherein.

DETAILED DESCRIPTION

Figure 1:
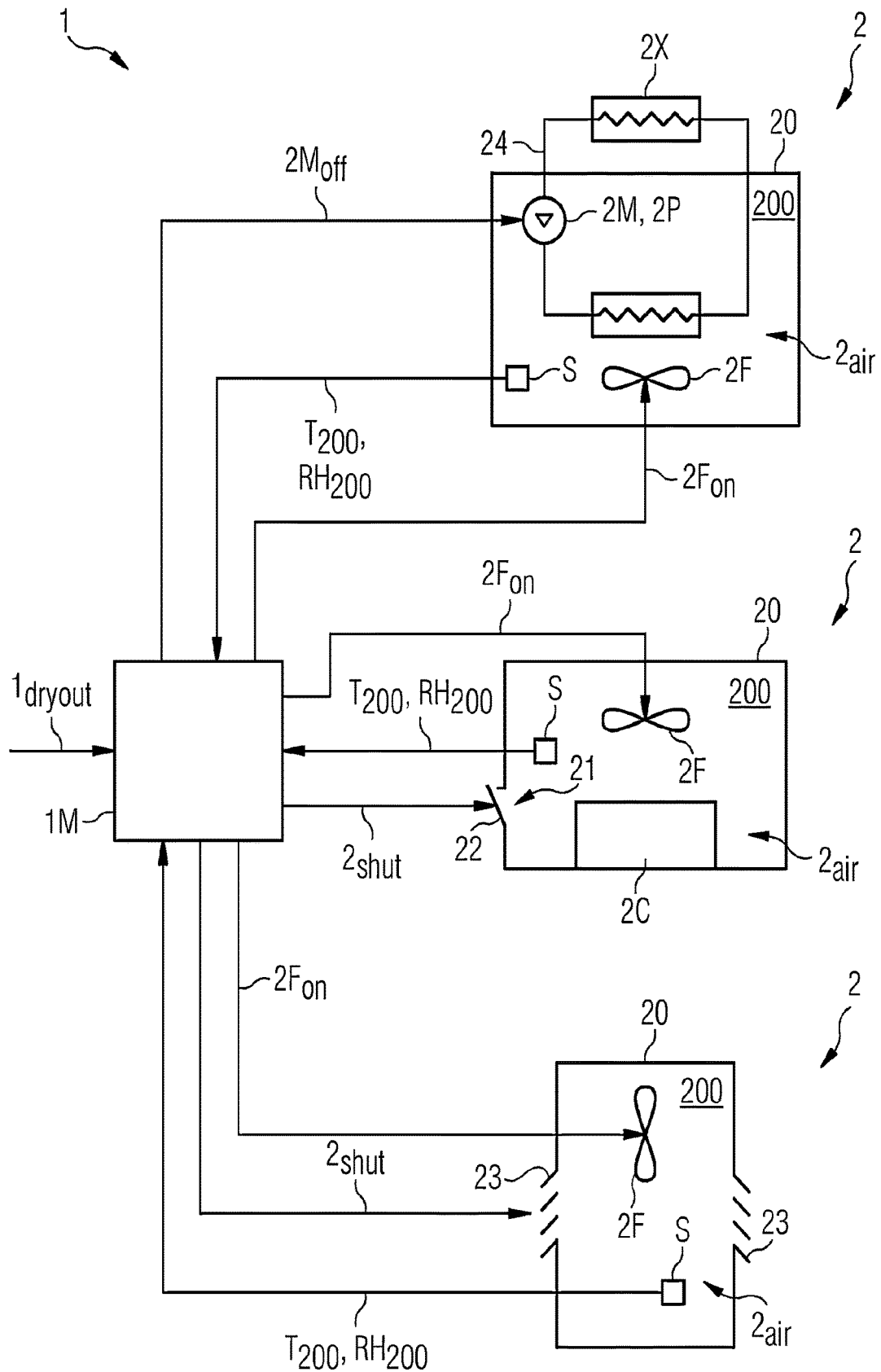
FIG. 1 shows an embodiment of the inventive wind turbine.

FIG. 1 shows a simplified schematic representation of an exemplary embodiment of a wind turbine 1 according to embodiments of the invention. The diagram indicates only the aspects that are relative to embodiments of the invention and shows: a number of fan-cooled units 2 and a dry-out management module 1M. On the right, the diagram shows three fan-cooled units 2. Each fan-cooled unit 2 comprises a housing 20 enclosing a quantity of air $2_{air}$ in its interior 200: one or more fans 2F disposed in the interior 200, and a removing thermal energy during "normal" operation of that unit 2. A fan-cooled unit 2 may also enclose one or more critical components that must be dry before being switched on. In descending order, these fan-cooled units 2 are: a cooling unit of a climate control arrangement: a wind turbine nacelle or wind turbine tower containing various electrical components (collectively referred to by the label 2C); and a forced ventilation unit 2. Each fan-cooled unit 2 includes one or more sensors S for monitoring climate parameters in the housing interior 200. The dry-out management module 1M may be realized as part of the wind turbine controller of the wind turbine 1, but is shown here as a functional module in order to explain embodiments of the invention.

The dry-out management module 1M is configured to receive a dry-out command 1 dryout after a prolonged off-grid state of the wind turbine 1, and to execute steps of the inventive method in order to perform a dry-out procedure.

In this exemplary embodiment, one fan-cooled unit 2 is an air-to-liquid heat-exchange unit or cooling unit, with a pump 2P that can transport cooling fluid through pipes of a cooling circuit 24. This cooling unit may be constructed to circulate air through the generator during normal operation in order to cool the armature and/or field windings (not shown). During normal operation of that unit 2, a fan 2F blows warm air (heated during normal operation of the wind turbine) over the pipes 24. The cooling fluid in the pipes absorbs heat from the airflow and transports the warmed fluid to an external heat exchanger 2X, for example arranged in a panel at the rear of the nacelle. The thermal energy extraction this fan-cooled unit is realized by the cooling circuit 24 and the motor-driven pump 2P, and the dry-out management module is configured to issue a control signal $2M_{off}$ to switch the pump motor 2M off during the dry-out procedure. The dry-out management module 1M also issues a control signal $2F_{on}$ to switch on the fan 2F during the dry-out procedure. After completion of the dryout procedure, the fan is operated in the normal manner, and the pump is restarted.

The second fan-cooled unit 2 in this example represents any component 2C that is enclosed in a housing 20 with an air exit opening 21, which can be closed by a cover 22 actuated by the dry-out management module 1M, and wherein a fan 2F is arranged in the housing interior 200 and controllable by the dry-out management module 1M. An example of such a housing 20 may be the nacelle, a section of the wind turbine tower, the hub, etc. Here, the dry-out management module 1M issues a control signal $2_{shut}$ to close the cover 22 and a control signal $2F_{on}$ to switch on the fan 2F during a dry-out procedure. After completion of the dryout procedure, the fan is no longer required, and the cover can be left open. In an exemplary embodiment, the moveable cover 22 can engage with the housing 20 by an electromagnetic lock, which can be actuated by a signal $2_{shut}$ issued by the dry-out management module 1M.

The third fan-cooled unit 2 in this example is a ventilation unit 2 with two louvers 23 and a fan 2F that, during normal operation of the wind turbine, is used for forced ventilation of the nacelle interior. Here, the dry-out management module 1M issues a control signal $2_{shut}$ to close both louvres 23 during the dry-out procedure and opened again afterwards.

The dry-out management module 1M also issues a control signal $2F_{on}$ to switch on the fan 2F of this unit during a dry-out procedure. After completion of the dryout procedure, the fan is operated in the normal manner, and the louvers are controlled accordingly.

During the dry-out procedure, the dry-out management module 1M can operate the fans 2F to turn at their highest speed. For example, a fan control signal $2F_{on}$ may be a voltage reference that determines the fan speed. Because the unit housings are closed off (e.g., by control signals $2_{shut}$), the air inside each housing is heated by waste heat generated by the fan 2F, and also by the kinetic energy of the agitated air. As time passes, the heated air ensures that standing water evaporates from any surfaces inside the unit 2, and that the temperature of sensitive equipment 2C within the unit 2 is raised towards an acceptable level at which any critical components inside the unit 2 can be switched on.

Ultimately, an acceptable level of relative humidity and/or an acceptable temperature is reached, so that the dry-out procedure can conclude. The wind turbine may then be restarted safely. The dry-out management module 1M can then issue control signals to re-open previously closed covers 22, 23, and to allow the fans 2F to operate at a normal speed.

Figure 2:
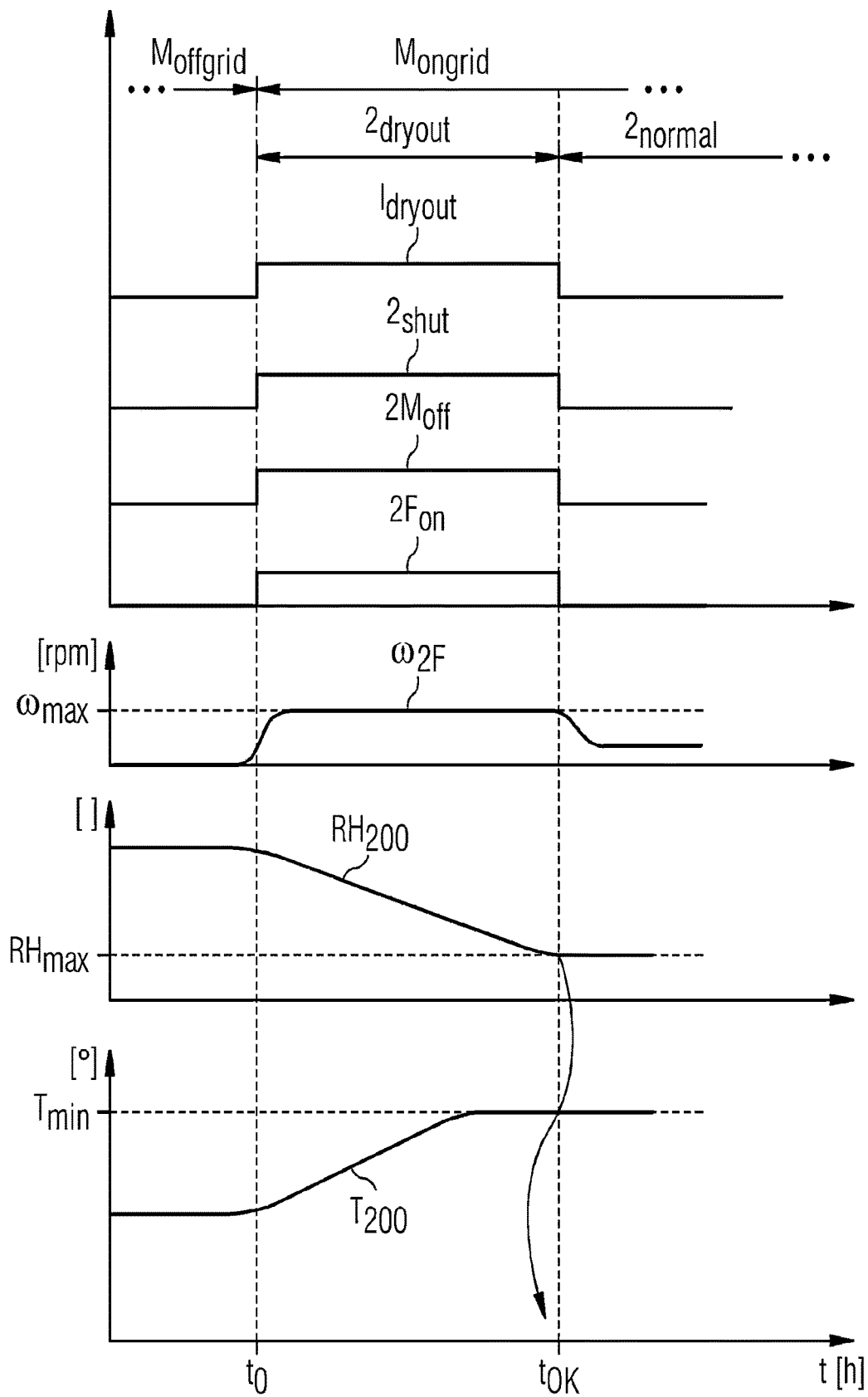
FIG. 2 is a graph to illustrate the inventive method.

FIG. 2 illustrates the inventive method. After an off-grid mode $M_{offgrid}$ comes to an end at time to, and the wind turbine is once again connected to the grid (in mode $M_{ongrid}$), the inventive method is initiated by setting a dry-out flag $I_{dryout}$ (this can be done by the wind turbine controller, for example). The dry-out management module 1M then issues one or more signals to close off the housings of one or more fan-cooled units 2. Each fan-cooled unit 2 will now be operated in a "dry-out mode" $2_{dryout}$. The dry-out management module 1M also issues suitable fan control signals $2F_{on}$ to switch on the fans 210. These can be controlled to raise the rotational speed $\omega_{2F}$ to a maximum $\omega_{max}$ as shown here. The dry-out management module 1M also issues a motor control signal $2M_{off}$ to keep the motor 2M of a fluid circuit pump 2P in its "off" state. With these control measures, the fan action causes the air temperature in the unit housings to increase, raising the air temperature and evaporating any standing water. The air temperature in the fan-cooled units 2 will ultimately reach a target minimum $T_{min}$, and the relative humidity $RH_{12}$ in the fan-cooled units 2 will ultimately drop to a target maximum $RH_{max}$. At this time $t_{OK}$, the dry-out procedure can be deemed complete, and the wind turbine may be restarted. Any cooling unit that was operated as a fan-cooled unit during dryout can then resume operation in its "normal" mode $2_{normal}$.

Figure 3:
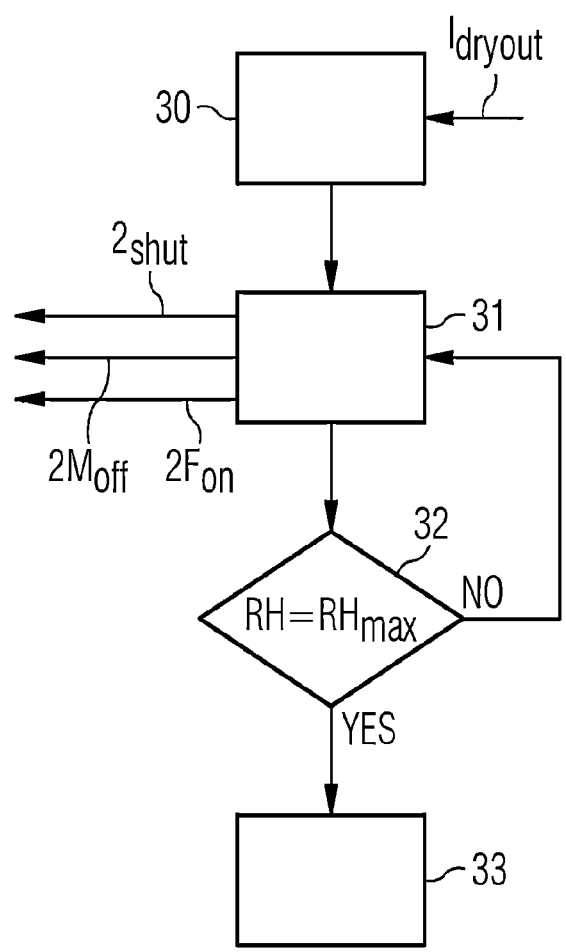
FIG. 3 is a flowchart to illustrate steps of the inventive method.

FIG. 3 is a flowchart to illustrate the method steps. In a first step 30, a dry-out flag $I_{dryout}$ is set to initiate the dry-out procedure. In step 31, the dry-out management module then issues signals $2_{shut}$, $2F_{on}$, $2M_{off}$ to close the air exit openings of any fan-cooled unit, to switch on the fans in the fan-cooled unit(s), and to switch off a pump motor of any fluid cooling circuit. In a next step 32, a measured parameter is compared to a target parameter (the relative humidity RH in the interior 200 of a fan-cooled unit 2, for example). The dry-out mode persists until the measured parameter has reached the target parameter. The dry-out procedure then concludes in step 33, and the dry-out management module clears the control signals as appropriate.

Figure 4:
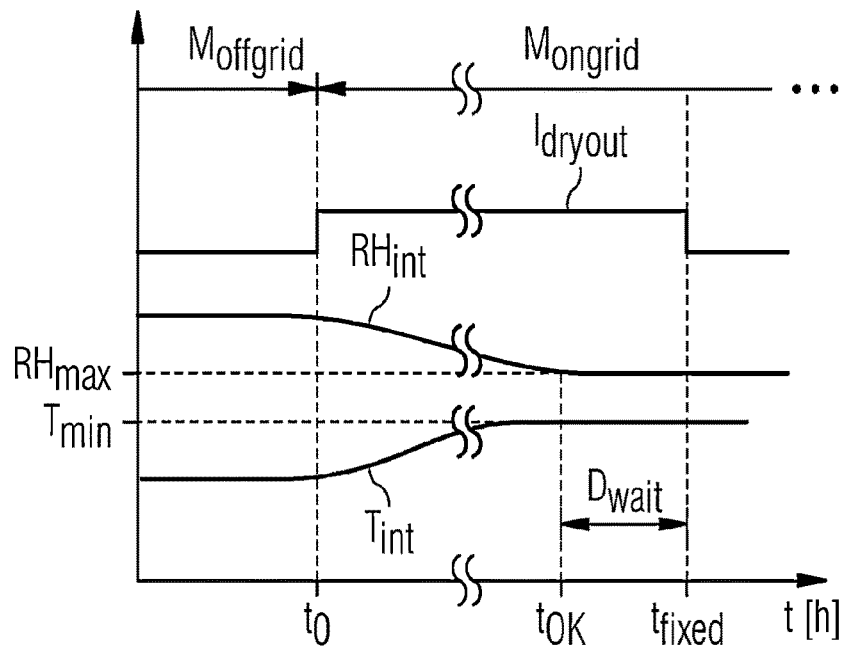
FIG. 4 illustrates a conventional approach.

FIG. 4 illustrates a conventional art approach. After an off-grid mode $M_{offgrid}$ comes to an end at time to, and the wind turbine is once again connected to the grid, the conventional art control method commences with a dry-out procedure (indicated by setting a flag $I_{dryout}$ for example) that persists until a fixed dry-out duration has elapsed. This can extend over several days, for example 72 hours, terminating here at time $t_{fixed}$, when the dry-out procedure is deemed complete and the wind turbine may be restarted. However, the temperature Tint and relative humidity $RH_{int}$ in the nacelle may have reached a suitable levels $T_{min}$, $RH_{max}$ some time previously, indicated here at time $t_{OK}$. Therefore, the wind turbine could have been started at time $t_{OK}$ instead of the later time $t_{fixed}$, and revenue has been lost in the intervening time $D_{wait}$.

Figure 5:
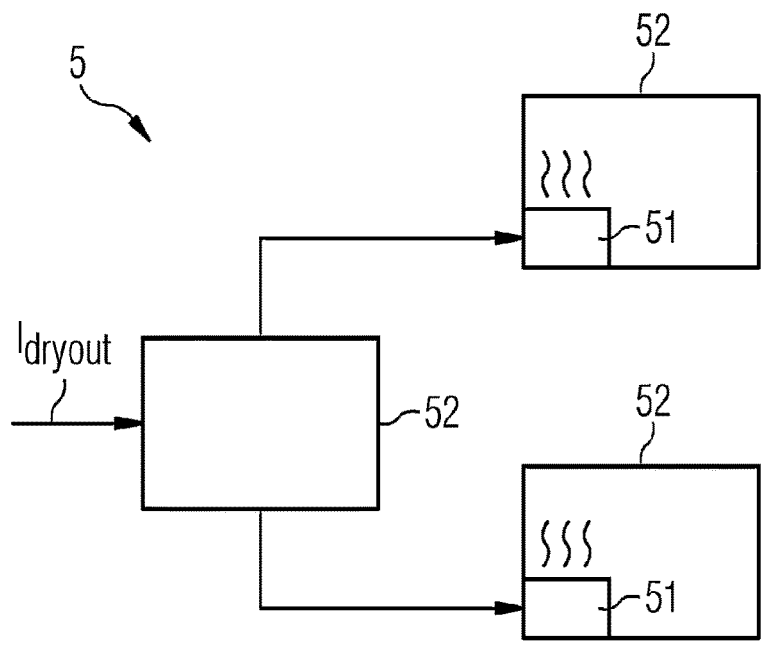
FIG. 5 shows components of a conventional wind turbine.

FIG. 5 shows a number of heaters 51 installed within housings of temperature-sensitive components 5C of a conventional art wind turbine 5. The heaters 51 are switched on when the wind turbine controller 52 detects the on-grid state, so that dry-out can be performed. While the heaters 51 can permit a shorter fixed dryout duration, the need to include heaters 51 adds to the overall cost of manufacture and maintenance. As described in FIG. 4 above, the dry-out procedure is performed for a set duration, for example 48 hours, but satisfactory startup conditions may be reached several hours before the predetermined duration elapses and remain undetected. Here also, potential revenue may be lost.

Although the present invention has been disclosed in the form of embodiments and variations thereon, it will be understood that numerous additional modifications and variations could be made thereto without departing from the scope of embodiments of the invention. For example, any wind turbine component that requires dry starting conditions but is not already enclosed in the housing of a fan-cooled unit may be adapted to benefit from the inventive method. This can be done by constructing a suitable housing (with one or more actuatable apertures) to enclose the component and by arranging one or more fans in the housing interior, so that the fans can be actuated by the dry-out management module. Particularly in the case of a large interior such as the interior of a large nacelle, or the interior of a tower, the cost of adapting a component as a "fan-cooled unit" may be insignificant compared to the benefits of a short dry-out procedure and the attendant gain in revenue.

For the sake of clarity, it is to be understood that the use of "a" or "an" throughout this application does not exclude a plurality, and "comprising" does not exclude other steps or elements.

The invention claimed is:

1. A method of controlling a wind turbine comprising at least one fan-cooled unit with a fan configured to circulate air inside a housing of the at least one fan-cooled unit, the method comprising:
   operating the at least one fan-cooled unit in a dryout mode by:
      disabling a thermal energy reduction means of the at least one fan-cooled unit, the thermal energy reduction means configured to reduce thermal energy of air inside the housing during a normal operation mode of the at least one fan-cooled unit;
      intentionally generating heat inside the housing by operating a fan of the at least one fan-cooled unit at an increased rotational speed compared to a normal cooling operation mode to circulate a quantity of air contained in the housing; and
      monitoring a climate parameter until a target climate condition has been reached.

2. The method according to claim 1, wherein the disabling the thermal energy reduction comprises closing an air exit opening in the housing of the at least one fan-cooled unit.

3. The method according to claim 1, wherein the disabling the thermal energy reduction comprises deactivating a fluid-to-air cooling circuit of the at least one fan-cooled unit.

4. The method according to claim 1, wherein the fan is operated at a maximum rotational speed during a dry-out procedure of the dry-out mode.

5. The method according to claim 1, wherein the target climate condition is a maximum relative humidity and/or a minimum temperature.

6. The method according to claim 1, further comprising operating the at least one fan-cooled unit in the normal cooling operation mode when the target climate parameter has been reached.

7. The method according to claim 6, wherein the operating the at least one fan-cooled unit in the normal cooling operation mode comprises: re-opening an air exit opening, activating a fluid-to-air cooling circuit, and/or reducing the rotational speed of the fan compared to the dryout mode.

8. A wind turbine comprising:
at least one fan-cooled unit comprising a fan arranged in an interior of a unit housing and a thermal energy reduction means configured to reduce thermal energy in air in the interior during a normal cooling operation mode of the at least one fan-cooled unit;
a sensor arrangement configured to monitor a climate parameter in a wind turbine nacelle; and
a dry-out management module configured to receive a dry-out command, and to execute the method according to claim 1 to perform a dry-out procedure.

9. The wind turbine according to claim 8, wherein the thermal energy reduction comprises an air exit opening in the unit housing, and wherein the dry-out management module is configured to close the air exit opening during the dry-out procedure.

10. The wind turbine according to claim 9, wherein a cover of the air exit opening comprises an electromagnetic lock configured to engage with the unit housing of the at least one fan-cooled unit, and wherein the dry-out management module is configured to actuate the electromagnetic lock.

11. The wind turbine according to claim 8, wherein the at least one fan-cooled unit is an air-to-liquid heat-exchanger.

12. The wind turbine according to claim 11, wherein the thermal energy reduction means of the heat-exchanger comprises a fluid cooling circuit, and wherein the dry-out management module is configured to deactivate the fluid cooling circuit during the dry-out procedure.

13. The wind turbine according to claim 8, wherein the at least one fan-cooled unit is a ventilation unit.

14. The wind turbine according to claim 13, wherein the thermal energy reduction the ventilation unit comprises louvers, and wherein the dry-out management module is configured to close the louvers during the dry-out procedure.

15. A computer program product, comprising a computer readable hardware storage device having computer readable program code stored therein, the program code executable by a processor of a computer system to implement a method according to claim 1.

16. The method according to claim 1, wherein the actuated fan heats the quantity of air inside the housing through electrical losses of the fan and kinetic energy from agitated air molecules, thereby reducing relative humidity towards an acceptable level.

17. The method according to claim 1, wherein the operating the at least one fan-cooled unit in the dryout mode occurs after an off-grid state.

* * * * *